Figure 1:
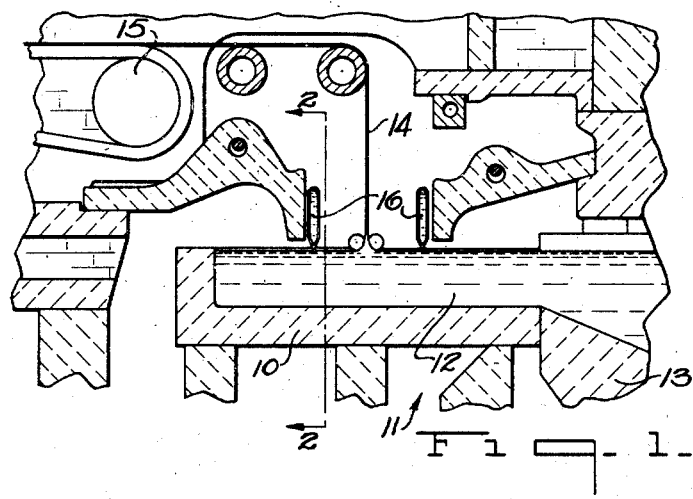

Feb. 5, 1929.

H. E. ALLEN 1,701,170

COOLER FOR SHEET GLASS APPARATUS

Filed Aug. 26, 1926

Inventor
Horace E. Allen
Frank Fraser
Attorney

Patented Feb. 5, 1929.

1,701,170

UNITED STATES PATENT OFFICE.

HORACE E. ALLEN, OF TOLEDO, OHIO, ASSIGNOR TO THE LIBBEY-OWENS SHEET GLASS COMPANY, OF TOLEDO, OHIO, A CORPORATION OF OHIO.

COOLER FOR SHEET-GLASS APPARATUS.

Application filed August 26, 1926. Serial No. 131,633.

This invention relates to improvements in sheet glass apparatus, and has more particular reference to a novel form of cooler for association therewith.

An important object of the present invention is to provide a cooler so constructed that it will have a uniform cooling action on molten glass from which a sheet may be drawn.

Another object of the invention is the provision of such a cooler which will improve the smoothness of a glass sheet being drawn, and which will further act as means for baffling or cooling heated air currents escaping from the furnace and heating chamber.

Other objects and advantages of the invention will become apparent during the course of the following description.

Heretofore, in the drawing of sheet glass, some difficulty has been experienced in uniformly cooling the molten glass from which the sheet is drawn. For instance, in the Colburn process of drawing sheet glass, set forth in U. S. Patent No. 1,248,809, granted December 4, 1917, is shown a pair of coolers having flat bottoms directly exposed to the molten glass passing thereunder but in spaced relation thereto, and these coolers are constructed of thin sheet metal having a cooling medium circulated therethrough. It has been found that the metal of which these coolers are constructed is wavy, and this waviness of the metal in the bottoms of the coolers creates an uneven cooling or heat absorbing action on the molten glass passing thereunder, which it is believed causes a corrugated appearance in a sheet drawn from this glass. In order to remove the corrugations in the cooler bottoms, they were filed or planed flat, but this caused some parts of the metal to be thinner than others, which has the same resultant effect as the wavy bottom, namely, ununiform heat absorption. As above stated, the primary purpose of the present invention is to construct a cooler which will afford a uniform heat absorption.

Figure 2:
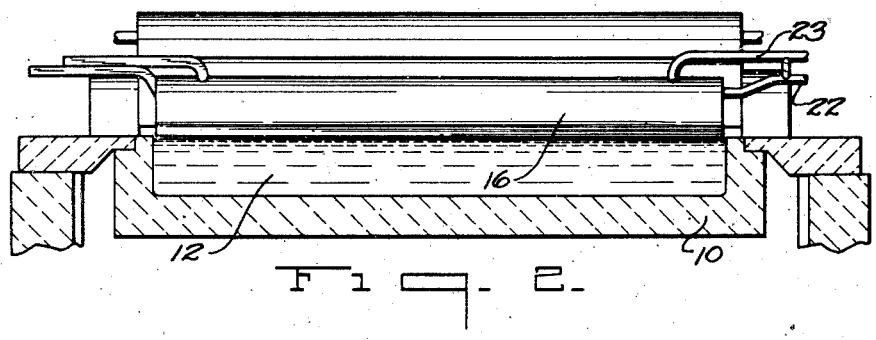
Figures 3, 4:
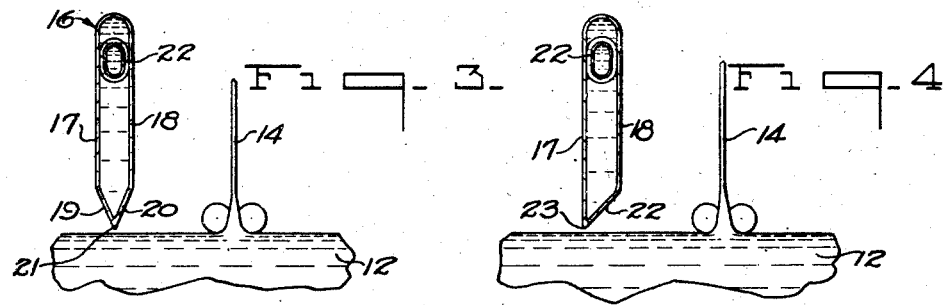

In the accompanying drawings forming a part of this application, and wherein like characters of reference designate corresponding parts throughout the several views:

Fig. 1 is a longitudinal vertical sectional view of a portion of sheet drawing apparatus, showing associated therewith in cross section a pair of coolers constructed in accordance with the present invention, Fig. 2 is a transverse vertical section taken substantially on line 2—2 in Fig. 1, Fig. 3 is an enlarged detail sectional view of one of the coolers shown in Fig. 1, and Figs. 4, 5 and 6 are views similar to Fig. 3, but showing slightly modified types of coolers.

Referring more in detail to the accompanying drawings and especially to Figs. 1 to 3 inclusive, 10 generally designates a receptacle or draw pot supported above the heating chamber 11, and containing the molten glass 12 which is supplied thereto from the furnace 13. A sheet of glass 14 is drawn from the molten glass 12 in the receptacle by means of the drawing mechanism 15. Positioned at each side of the sheet 14 and immediately adjacent to the surface of the molten glass 12, are the coolers 16, which serve to protect the sheet from heated air currents escaping from the furnace and heating chamber, and at the same time aid in absorbing the heat from the glass passing thereunder to give it the proper viscosity to permit it to be drawn away in sheet form.

The coolers 16 are identical in construction so that a detailed description of only one of them is thought to be necessary. The cooler is preferably made of sheet metal and is designed to form a hollow elongated casing, the greater portion of the side walls 17 and 18 being straight and preferably parallel. The lower portions of the side walls 17 and 18 converge toward one another as indicated at 19 and 20, and terminate in a feather edge 21, which edge is disposed equi-distant the side walls 17 and 18. The casing is internally cooled by circulating a cooling medium therethrough, such as relatively cool water. The cooling medium enters the cooler through the pipe 22 extending longitudinally within the casing, and passes therefrom through a plurality of openings therein into the casing. This cooling fluid then passes exteriorly of the casing through the pipe 23.

Figures 5, 6:
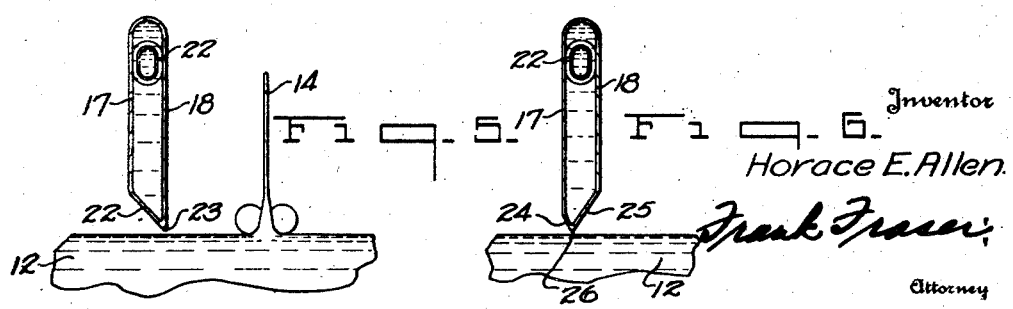

In Fig. 4, wherein has been shown a somewhat slightly modified type of cooler, the side wall 17 extends downwardly beyond the side wall 18, and these walls are connected by an inclined bottom 22 which slants downwardly from the side 18 to the side 17. The type of cooler shown in Fig. 5 is somewhat similar to the cooler shown in Fig. 4, the difference being that the side wall 18 projects downwardly beyond the side wall 17, and the inclined bottom 22 slants downwardly from the side 17 to the side 18. In Fig. 6 the side 17 extends downwardly beyond the side 18 with the lower end thereof slanting inwardly and downwardly as at 24. An inclined bottom 25 is provided which slants downwardly from the side 18 and is connected with the slanting portion 24 to define a feather edge 26.

In operation, the molten glass flows from the furnace and fills the shallow glass drawing receptacle or draw pot 10. A relatively small area of the surface glass about the center of the receptacle is exposed to the atmosphere, and is further uniformly cooled by means of the coolers described hereinabove. It is from this uniformly cooled area that a sheet of glass of greater smoothness is drawn. From beneath the receptacle and from the furnace very highly heated gases escape, and the coolers provided by the present invention serve to baffle and cool these heated gases and so prevent their damaging action on the formation of the sheet.

It will be noted that all of the various types of coolers, hereinabove described, comprise an elongated casing including a pair of sides terminating at their lower ends in a single feather edge or line which extends transversely substantially the entire width of the molten glass, thus affording a uniform heat absorption.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In combination in sheet glass apparatus, a receptacle containing a mass of molten glass, means for drawing a sheet upwardly therefrom, and coolers arranged at opposite sides of said sheet, each cooler comprising an elongated casing extending transversely of the sheet and having a pair of side walls terminating at their lower end in a feather edge which is positioned in close proximity to the mass of molten glass.

2. In combination in sheet glass apparatus, a receptacle containing a mass of molten glass, means for drawing a sheet upwardly therefrom, and a cooler arranged at one side of said sheet, said cooler comprising an elongated casing extending transversely of the sheet and having a pair of side walls terminating at their lower end in a feather edge which is positioned in close proximity to the mass of molten glass.

Signed at Toledo, in the county of Lucas and State of Ohio, this 21st day of August, 1926.

HORACE E. ALLEN.